United States Patent
DeRosa

(10) Patent No.: US 7,066,857 B1
(45) Date of Patent: Jun. 27, 2006

(54) REAR DERAILLEUR GUARD

(76) Inventor: Umberto DeRosa, 56 Eltingville Blvd., Staten Island, NY (US) 10312

(*) Notice: Subject to any disclaimer, the term of this patent is extended or adjusted under 35 U.S.C. 154(b) by 449 days.

(21) Appl. No.: 10/700,756

(22) Filed: Nov. 4, 2003

(51) Int. Cl.
  *B62J 13/00* (2006.01)
  *B62J 23/00* (2006.01)

(52) U.S. Cl. .......................... 474/144; 82/146

(58) Field of Classification Search ............... 474/144, 474/146, 78–80; 74/606 R, 608; D12/127, D12/114
See application file for complete search history.

(56) References Cited

U.S. PATENT DOCUMENTS

| | | | | |
|---|---|---|---|---|
| 671,816 | A | * 4/1901 | Cooley | 474/144 |
| 1,325,206 | A | 12/1919 | Raybon | |
| 3,184,993 | A | * 5/1965 | Swenson | 474/144 |
| D208,683 | S | * 9/1967 | Schreckengost | D12/127 |
| 4,044,621 | A | 8/1977 | McGregor, Sr. et al. | 74/243 |
| 4,639,240 | A | * 1/1987 | Liu | 474/144 |
| 4,905,541 | A | * 3/1990 | Alan | 74/608 |
| D321,334 | S | * 11/1991 | Greenlaw | D12/114 |
| D323,309 | S | 1/1992 | Perry | D12/127 |
| D355,872 | S | * 2/1995 | Haney et al. | D12/127 |
| 5,540,118 | A | 7/1996 | Calendrille, Jr. | 74/608 |
| 6,203,459 | B1 | 3/2001 | Calendrille, Jr. | 474/82 |
| 6,332,853 | B1 | 12/2001 | Bowman | 474/146 |
| 2004/0254038 | A1 | * 12/2004 | Chamberlain et al. | 474/144 |

FOREIGN PATENT DOCUMENTS

| DE | 3537625 A1 * 4/1987 | 280/152 R |
|---|---|---|
| DE | 19963819 A1 * 10/2000 | |
| WO | WO (92/17365 A1 * 10/1992 | |

* cited by examiner

*Primary Examiner*—Marcus Charles
(74) *Attorney, Agent, or Firm*—Goldstein Law Offices PC.

(57) ABSTRACT

A rear derailleur guard for mounting onto a bicycle with an axle, a wheel, a horizontal frame member, a vertical frame member and a rear derailleur. The guard has a main region with an apex, a horizontal member that extends forwardly from the main region and contains a semi-circular horizontal clip, a vertical member that extends upwardly from the main region and contains a semi-circular vertical clip and a lower shield that extends downwardly and forwardly from the main region. When the guard is mounted, the horizontal clip attaches to the horizontal frame member and the vertical clip attaches to the vertical frame member. The axle protrudes between the horizontal member and the vertical member adjacent to the apex. The lower shield has an inside edge, an outside edge and exterior and interior surfaces extending therebetween. The outside edge curves such that it is perpendicular to the interior surface.

7 Claims, 3 Drawing Sheets

REAR DERAILLEUR GUARD

BACKGROUND OF THE INVENTION

1. Field of the Invention

The invention generally relates to a bicycle derailleur protection device, and in particular it relates to a guard that a user can mount onto a bicycle to protect the rear derailleur from external debris and damage.

2. Description of the Related Art

As more and more Americans have become aware of the numerous health benefits provided by regular exercise, recreational bicycling has become increasingly popular. In recent years, many areas in public places such as parks have been dedicated as bicycle paths in order to accommodate interested bicyclists. The wide variety of available bicycle designs has allowed enthusiasts to enjoy bicycling over terrains of all types, from suburban sidewalks to rocky mountains.

Many bicycles contain several gears that provide different gear ratios to adapt to different torque/speed requirements. In order to provide different gear ratios during pedaling, a plurality of different sized chain sprockets are mounted for rotation along the axes of the rear hub and the pedal shaft of the bicycle. Typically, there are two or three different sized chain sprockets, known as chain rings, rotatable along the axis of the pedal shaft and six or seven different sized chain sprockets, known as freewheel cogs, mounted in spaced relation on a free wheel and rotatable along the axis of the rear hub. The freewheel cogs are arranged such that those with the largest diameters are on the inside while others are located toward the outside in order of decreasing diameters. The number of available gear ratios increases with the number of chain rings and cogs that are provided.

It is necessary to move the chain from one freewheel cog to another and/or from one chain ring to another in order to change gears. This operation is performed by a front derailleur associated with the chain rings and a rear derailleur associated with the free wheels. A conventional rear derailleur includes a clamping assembly which secures the derailleur to a rear drop-out or rear axle holder of the bicycle frame, a chain cage which moves the chain from one cog to another and a controller which connects the chain cage to the clamping assembly and actuates the chain cage to control the latter to move the chain from one cog to another.

However, an acute and potentially dangerous problem arises when proper operation of the front or rear derailleurs of a bicycle is impaired. This situation can develop under a variety of circumstances. For example, a user can drive his bicycle through an area that contains fresh mud or wet soil that can stick to the derailleurs. Alternatively, a biker can ride his mountain bicycle through a region in which there are fallen tree limbs or pebbles that get caught up in components of the derailleurs. Moreover, significant damage to a derailleur can easily result when a user accidentally drops the bicycle on its side or prevailing winds blow it over. Hence, there is a pressing need for an easily mountable and removable device that covers a derailleur without interfering with the mechanical operation of the bicycle or diminishing a rider's enjoyment thereof.

U.S. Pat. No. Des. 323,309 to Perry ("Perry") teaches an ornamental design for a bicycle freewheel gear cover. However, a gear cover having the design of Perry would be bulky and cumbersome since it would have multiple tiers of concentric circles.

U.S. Pat. No. 1,325,206 to Raybon ("Raybon") discloses a driving gear casing for bicycles. However, the driving gear casing of Raybon does not shield a rear derailleur.

U.S. Pat. No. 4,044,621 to McGregor et al. ("McGregor") teaches a sprocket structure and chain guard. However, the apparatus of McGregor also does not shield a rear derailleur.

U.S. Pat. No. 5,540,118 to Calendrille ("Calendrille I") teaches a flexible bicycle derailleur cover. However, the derailleur cover of Calendrille I is unduly complicated and confusing.

U.S. Pat. No. 6,203,459 B1 to Calendrille ("Calendrille II") teaches another bicycle derailleur cover. However, the derailleur cover of Calendrille II is also unduly complicated and confusing.

U.S. Pat. No. 6,332,853 B1 to Bowman ("Bowman") teaches a removable and flexible cover for a bicycle drive train. However, the cover of Bowman is not specifically configured to shield a rear derailleur.

While these devices may be suitable for the particular purposes employed, or for general use, they would not be as suitable for the purposes of the present invention as disclosed hereafter.

SUMMARY OF THE INVENTION

It is an object of the invention to provide a rear derailleur guard that protects a rear derailleur from external debris. Accordingly, the rear derailleur guard has a lower shield that covers the rear derailleur.

It is another object of the invention to provide a rear derailleur guard that has a configuration that enhances its effectiveness in shielding a rear derailleur. Accordingly, the rear derailleur guard has a main region from which a horizontal member, a vertical member and a lower shield extend.

It is a further object of the invention to provide a rear derailleur guard that a user can readily attach to, and detach from, a bicycle. Accordingly, the rear derailleur guard has a horizontal clip that snaps onto a horizontal frame member of a bicycle and a vertical clip that snaps onto a vertical frame member of a bicycle.

The invention is a rear derailleur guard for mounting onto a bicycle with an axle, a wheel, a horizontal frame member, a vertical frame member and a rear derailleur. The guard has a main region with an apex, a horizontal member that extends forwardly from the main region and contains a semi-circular horizontal clip, a vertical member that extends upwardly from the main region and contains a semi-circular vertical clip and a lower shield that extends downwardly and forwardly from the main region. When the guard is mounted, the horizontal clip attaches to the horizontal frame member and the vertical clip attaches to the vertical frame member. The axle protrudes between the horizontal member and the vertical member adjacent to the apex. The lower shield has an inside edge, an outside edge and exterior and interior surfaces extending therebetween. The outside edge curves such that it is perpendicular to the interior surface.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
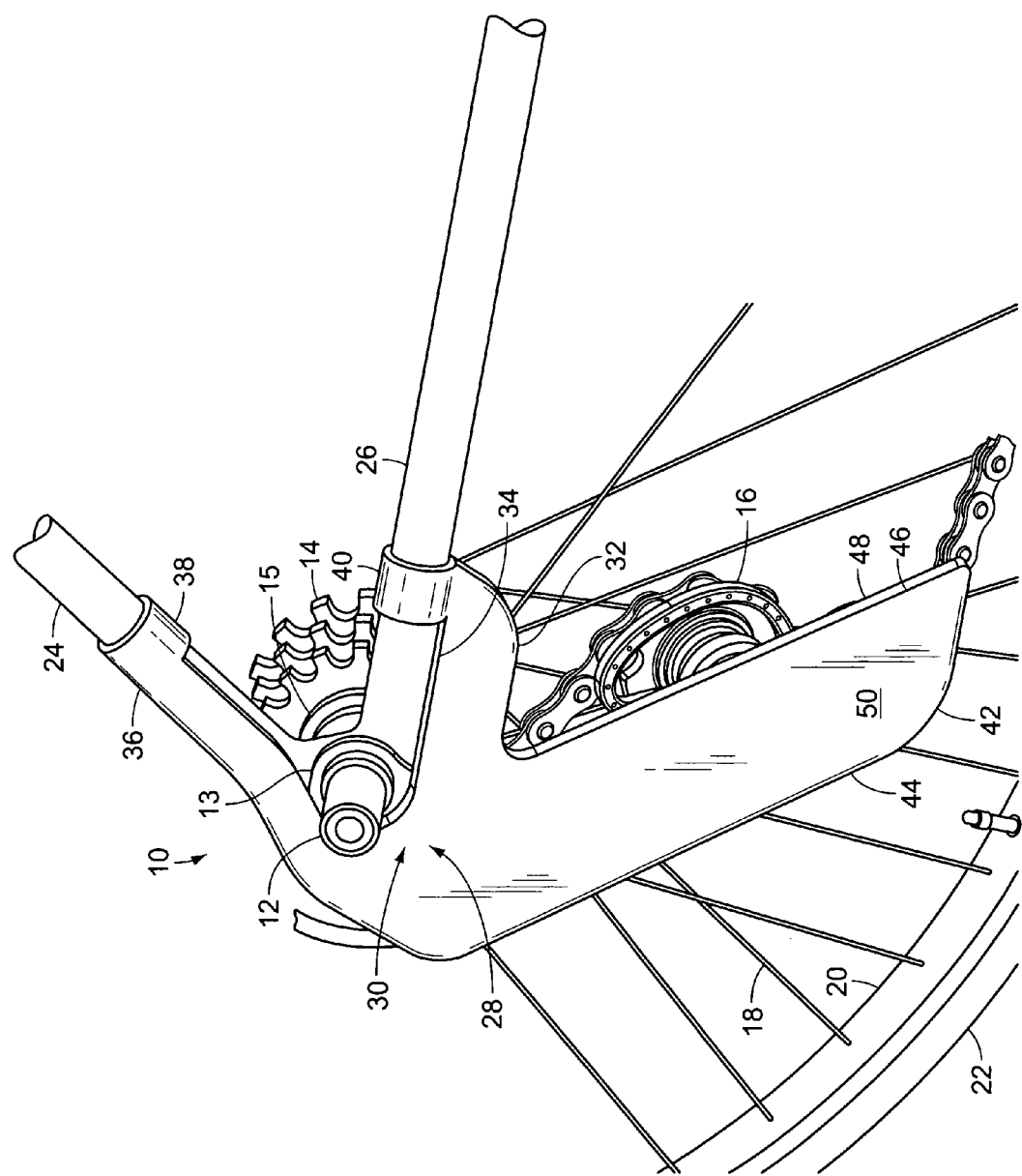
FIG. 1 is a diagrammatic perspective view of the rear derailleur guard according to the present invention mounted onto the rear portion of a multi-gear bicycle.

FIG. 1 illustrates the rear derailleur guard 10 according to the present invention mounted onto the rear portion of a multi-gear bicycle. The bicycle rear portion has a vertical frame member 24, a horizontal frame member 26, a gear wheel 15, a rear derailleur 16 and a wheel comprising a central axle 12, a central hub 13, a plurality of concentric chain sprockets 14, a plurality of spokes 18, an outer ring 20 and a tire 22. The axle 12 projects through the center of the chain sprockets 14. In addition, the gear wheel 15, onto which the chain sprockets 14 are positioned, rotates freely about the longitudinal axis of the hub 13. The spokes 18 of the bicycle extend radially from the hub 13 to the outer ring 20 and are evenly spaced around the circumference of the wheel.

The guard 10 has a main region 28 with an vertex 30 near the center of the guard 10, a horizontal member 32, a vertical member 36 and a lower shield 42. The axle 12 protrudes between the horizontal member 32 and the vertical member 36 adjacent to the vertex 30. The horizontal member 32 has an upper edge 34 and extends forwardly from the main region 28, while the vertical member 36 extends upwardly from the main region 28. In order to maximize the effectiveness of the guard 10, the upper edge 34 is located directly below, and substantially parallel to, the horizontal frame member 26. A horizontal clip 40 is present on an end of the horizontal member 36 opposite from the main region 28, and a vertical clip 38 is located on an end of the vertical member 36 opposite from the main region 28. The lower shield 42, which extends downwardly and forwardly from the main region 28, has an inside edge 44, an outside edge 46, an interior surface 48 and an exterior surface 50. The lower shield 42 covers the rear derailleur 16. A metallic alloy such as stainless steel or a durable and non-corrosive polymer can be used to construct the guard 10.

Figure 2:
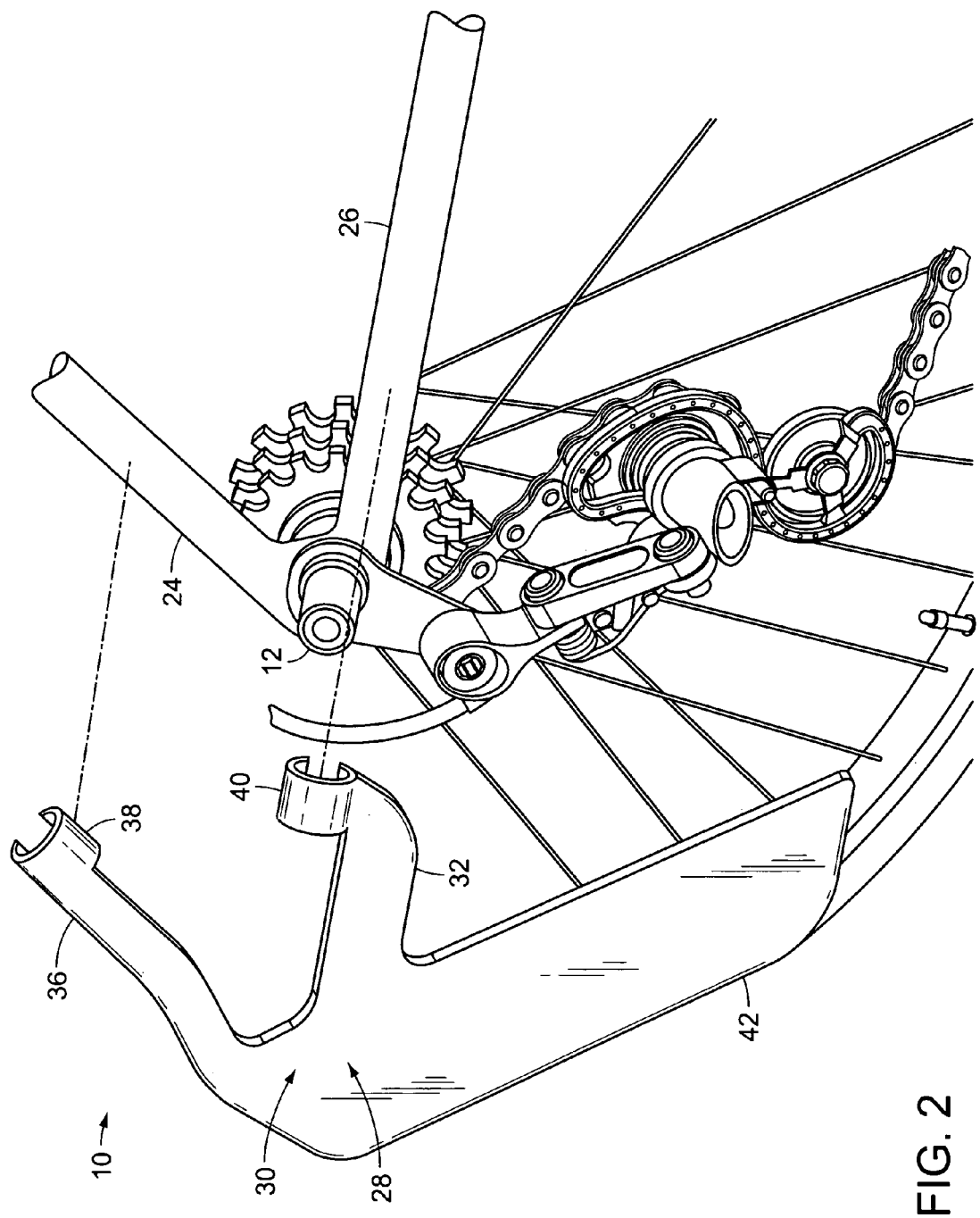
FIG. 2 is a diagrammatic perspective view of the rear derailleur guard being mounted onto the rear portion of the bicycle.

FIG. 2 depicts the guard 10 being mounted onto the rear portion of the bicycle. The vertical member 36 forms an acute angle with the horizontal member 32 at the vertex 30 on the main region 28 of the guard 10. Phantom lines indicate that the vertical clip 38 engages the vertical frame member 24 and the horizontal clip 32 engages the horizontal frame member 26. Preferably, the vertical clip 38 and the horizontal clip 40 have substantially semi-circular cross-sectional shapes that have narrow openings. When a user presses the horizontal clip 40 against the horizontal frame member 26, and the vertical clip 38 against the vertical frame member 24, the openings temporarily expand to allow the guard 10 to be snapped into position.

Figure 3:
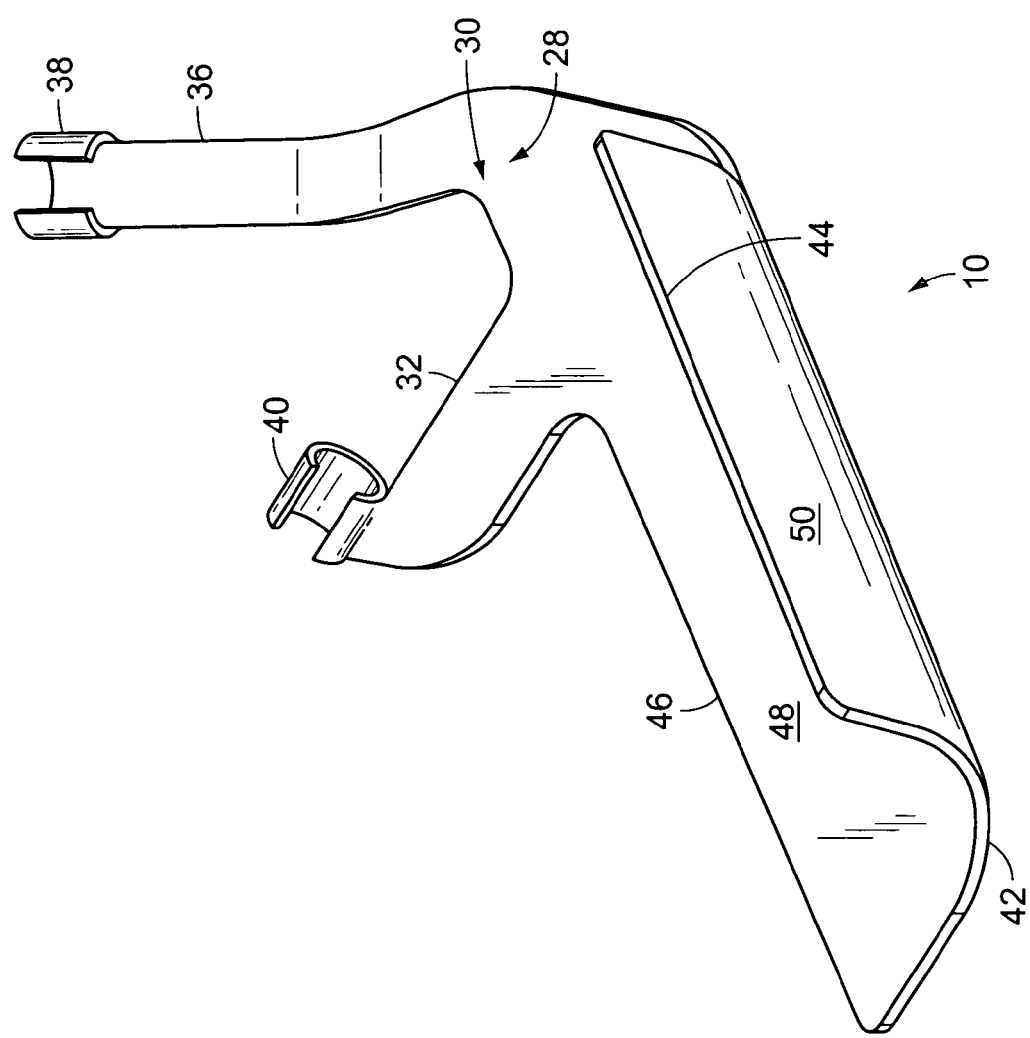
FIG. 3 is a diagrammatic perspective view of the rear derailleur guard.

FIG. 3 shows the guard 10 in more detail. The lower shield 42 has an interior surface 48 and an exterior surface 50 that extend between the inside edge 44 and the outside edge 46. The outside edge 46 curves such that it is perpendicular to the interior surface 48. The interior surface 48 and the exterior surface 50 are coextensive and generally smooth. The horizontal member 32, the vertical member 36, the lower shield 42 and the main region 28 are substantially co-planar. When the guard 10 is mounted onto a bicycle, it is located such that the axle 12 is adjacent to the vertex 30 and perpendicular to the exterior surface 50. In this position, the interior surface 48 is parallel to the wheel and the inside edge 44 extends behind the derailleur 16.

In conclusion, herein is presented a rear derailleur guard. The invention is illustrated by example in the drawing figures, and throughout the written description. It should be understood that numerous variations are possible, while adhering to the inventive concept. Such variations are contemplated as being a part of the present invention.

What is claimed is:

1. A rear derailleur guard for mounting onto a bicycle having an axle, a horizontal frame member, a vertical frame member and a rear derailleur, the rear derailleur guard comprising:

a main region having an vertex;

a horizontal member extending forwardly from the main region, the horizontal member having an upper edge;

a vertical member extending upwardly from the main region, forming an acute angle with the horizontal member at the apex on the main region;

a horizontal clip on the horizontal member for engaging the horizontal frame member;

a vertical clip on the vertical member for engaging the vertical frame member, such that when the vertical clip engages the vertical frame member and the horizontal clip engages the horizontal frame member, the axle protrudes between the horizontal member and the vertical member adjacent to the apex; and a lower shield extending downwardly and forwardly from the main region, the lower shield having an inside edge, an outside edge and exterior and interior surfaces extending therebetween, the outside edge curving to extend perpendicularly from the interior surface, so that when secured onto the bicycle the lower shield covers the derailleur and protects it from external debris.

2. The rear derailleur guard as recited in claim 1, wherein the upper edge of the horizontal member is positioned directly below, and substantially parallel to, the horizontal frame member.

3. The rear derailleur guard as recited in claim 2, wherein the horizontal member, the vertical member, the lower shield and the main region are substantially co-planar.

4. The rear derailleur guard as recited in claim 3, wherein the horizontal clip has a substantially semi-circular shape having an opening so that when the horizontal clip is pressed against the horizontal frame member the opening expands to allow the horizontal clip to extend around said horizontal frame member.

5. The rear derailleur guard as recited in claim 4, wherein the vertical clip has a substantially semi-circular shape having an opening so that when the vertical clip is pressed against the vertical frame member the opening expands to allow the vertical clip to extend around said vertical frame member.

6. A method of protecting a bicycle derailleur using a rear derailleur guard having a main region having an vertex, a horizontal member extending forwardly from the main region, a vertical member extending upwardly from the main region forming at acute angle the vertex with the vertical member at the vertex, a horizontal clip on the horizontal member, a vertical clip on the vertical member and a lower shield extending downwardly and forwardly from the main region, the lower shield having an inside edge, an outside edge and exterior and interior surfaces extending therebetween, the method for use on a bicycle having a wheel, an axle, a horizontal frame member and a vertical frame member, the method comprising the steps of:

positioning the guard adjacent to the wheel by positioning the axle adjacent to the vertex and perpendicular to the exterior surface; snapping the horizontal clip onto the horizontal frame member; and snapping the vertical clip onto the vertical frame member.

7. The method of protecting a bicycle derailleur as recited in claim 6, wherein the step of positioning the guard adjacent to the wheel further comprises positioning the interior surface substantially parallel to the wheel and positioning the inside edge to extend substantially perpendicular to the wheel and behind the derailleur.

* * * * *